US011228862B2

(12) United States Patent
Stone et al.

(10) Patent No.: US 11,228,862 B2
(45) Date of Patent: Jan. 18, 2022

(54) GRAPHICAL USER INTERFACE WITH DYNAMICALLY CHANGING PROXIMITY-BASED TILES

(71) Applicant: Cashstar, Inc., Portland, ME (US)

(72) Inventors: David D. Stone, Falmouth, ME (US); Phelps A. Peeler, Portland, ME (US)

(73) Assignee: CASHSTAR, INC., Portland, ME (US)

( * ) Notice: Subject to any disclaimer, the term of this patent is extended or adjusted under 35 U.S.C. 154(b) by 418 days.

(21) Appl. No.: 15/880,253

(22) Filed: Jan. 25, 2018

(65) Prior Publication Data

US 2018/0150868 A1 May 31, 2018

Related U.S. Application Data

(63) Continuation of application No. 15/246,206, filed on Aug. 24, 2016, now abandoned, which is a
(Continued)

(51) Int. Cl.
*G06Q 30/02* (2012.01)
*H04W 4/029* (2018.01)
(Continued)

(52) U.S. Cl.
CPC .......... *H04W 4/029* (2018.02); *G06F 3/0482* (2013.01); *G06Q 20/06* (2013.01); *G06Q 20/20* (2013.01);
(Continued)

(58) Field of Classification Search
CPC ........... G06Q 30/0259; G06Q 30/0261; G06Q 30/0241; G06Q 30/0251; G06Q 30/0266;
(Continued)

(56) References Cited

U.S. PATENT DOCUMENTS 6,430,500 B1 * 8/2002 Kubota .............. G01C 21/3617
340/995.23
6,829,586 B2 12/2004 Postrel
(Continued)

OTHER PUBLICATIONS

American Express: American Express Business Gift Cards & Corporate Gift Cards [online] [Retrieved on Jul. 11, 2012]. Retrieved from Internet: <URL: https://www311.americantexpress.com/BOLWeb/bolfeOrder.do?request_type=orderProduct&promotion=ACP&program=ACPBUS&selleracctnbr=64300989991&intlink=GC:HmPg:BGC> (6 pages).
(Continued)

*Primary Examiner* — Scott D Gartland
(74) *Attorney, Agent, or Firm* — Panitch Schwarze Belisario & Nadel LLP

(57) ABSTRACT

A graphical user interface (GUI) has dynamically changing user-selectable graphical tiles that automatically reorder in closest-to-farthest order based on a real-time location of an electronic computing device having a location tracking device. Physical entities near the device are displayed on the GUI. As the location of the device changes, the list dynamically changes in real time by reordering display of the tiles on the GUI so that a closest of the physical entities is displayed topmost. A points balance associated with a user of the electronic computing device is displayed. A window is displayed in response to triggering events. The user can select one of the tiles, or the device can come within a minimum threshold distance. In response to a selection or user input, an exchange value is received from an external computer server corresponding to a number of points. An electronic transaction is facilitated using the exchanged points.

14 Claims, 10 Drawing Sheets

Related U.S. Application Data continuation of application No. 14/819,833, filed on Aug. 6, 2015, now abandoned, which is a continuation of application No. 13/467,199, filed on May 9, 2012, now abandoned.

(51) Int. Cl.
| | |
|---|---|
| *H04L 29/08* | (2006.01) |
| *G06Q 20/32* | (2012.01) |
| *G06Q 20/06* | (2012.01) |
| *G06Q 20/20* | (2012.01) |
| *G06Q 30/06* | (2012.01) |
| *G06F 3/0482* | (2013.01) |
| *G06Q 20/34* | (2012.01) |
| *H04W 4/02* | (2018.01) |

(52) U.S. Cl.
CPC ....... *G06Q 20/3224* (2013.01); *G06Q 20/342* (2013.01); *G06Q 30/0207* (2013.01); *G06Q 30/0233* (2013.01); *G06Q 30/06* (2013.01); *H04L 67/18* (2013.01); *H04W 4/02* (2013.01)

(58) Field of Classification Search
CPC ........... G06Q 30/0267; G06Q 30/0271; G06Q 30/0276; G06Q 30/0277; G06Q 30/0601; G06Q 30/0639; G06Q 30/0641; G06Q 30/0643; G06Q 20/342; G06Q 20/3224; G06Q 30/0233; G06F 3/0482; H04W 4/02
USPC ....................................................... 705/14.33
See application file for complete search history.

(56) References Cited

U.S. PATENT DOCUMENTS

| | | | |
|---|---|---|---|
| 7,487,112 | B2 | 2/2009 | Barnes, Jr. |
| 7,706,831 | B2 | 4/2010 | Richardson et al. |
| 7,711,620 | B2 | 5/2010 | Abifaker |
| 7,953,654 | B2 | 5/2011 | Abifaker |
| 2001/0054003 | A1 | 12/2001 | Chien et al. |
| 2002/0107731 | A1 | 8/2002 | Teng |
| 2003/0182191 | A1 | 9/2003 | Oliver et al. |
| 2003/0216960 | A1 | 11/2003 | Postrel |
| 2005/0021400 | A1 | 1/2005 | Postrel |
| 2005/0251446 | A1 | 11/2005 | Jiang et al. |
| 2005/0272442 | A1 | 12/2005 | Miller et al. |
| 2006/0161478 | A1 | 7/2006 | Turner et al. |
| 2007/0185777 | A1* | 8/2007 | Pyle ........................ G06Q 30/02 705/26.62 |
| 2008/0052151 | A1 | 2/2008 | Xie et al. |
| 2008/0052164 | A1 | 2/2008 | Abifaker |
| 2008/0133580 | A1* | 6/2008 | Wanless ............ H04M 1/72457 |
| 2008/0208742 | A1 | 8/2008 | Arthur et al. |
| 2008/0255942 | A1 | 10/2008 | Craft |
| 2009/0094134 | A1 | 4/2009 | Toomer et al. |
| 2009/0112709 | A1 | 4/2009 | Barhydt et al. |
| 2009/0138396 | A1 | 5/2009 | Boal |
| 2009/0210318 | A1 | 8/2009 | Abifaker |
| 2010/0042517 | A1 | 2/2010 | Paintin et al. |
| 2010/0082448 | A1 | 4/2010 | Lin et al. |
| 2010/0082489 | A1 | 4/2010 | Lin et al. |
| 2010/0131347 | A1 | 5/2010 | Sartipi |
| 2010/0179869 | A1 | 7/2010 | Hofer et al. |
| 2010/0179870 | A1 | 7/2010 | Postrel |
| 2010/0293056 | A1* | 11/2010 | Flynt .................. G06Q 30/0261 705/14.58 |
| 2010/0318407 | A1* | 12/2010 | Left .................... G06Q 30/0207 705/14.1 |
| 2011/0015955 | A1 | 1/2011 | Hessburg et al. |
| 2011/0029364 | A1 | 2/2011 | Roeding et al. |
| 2011/0035269 | A1 | 2/2011 | Cohagan et al. |
| 2011/0071895 | A1* | 3/2011 | Masri ................. G06Q 30/0226 705/14.27 |
| 2011/0092227 | A1* | 4/2011 | Phukan ............. H04M 1/72572 455/456.3 |
| 2011/0112919 | A1 | 5/2011 | Gray |
| 2011/0117928 | A1 | 5/2011 | Barresse et al. |
| 2011/0173061 | A1* | 7/2011 | Anulewicz ............. G06Q 30/02 705/14.33 |
| 2011/0218884 | A1 | 9/2011 | Kothari et al. |
| 2012/0010931 | A1 | 1/2012 | Mehra et al. |
| 2012/0041808 | A1* | 2/2012 | Hofer ..................... G06Q 20/32 705/14.17 |
| 2012/0041819 | A1* | 2/2012 | Ramer ............... G06Q 30/0247 705/14.46 |
| 2012/0253914 | A1 | 10/2012 | Black |
| 2012/0290389 | A1* | 11/2012 | Greenough ........ G06Q 20/3224 705/14.53 |
| 2013/0159086 | A1 | 6/2013 | Richard |
| 2013/0268413 | A1 | 10/2013 | Burr et al. |

OTHER PUBLICATIONS

American Express: FAQs—American Express Business Gift Cards & Corporate Gift Cards [online] [retrieved Jul. 11, 2012]. Retrieved from the Internet:<URL:https://www.americanexpress.com/us/content/prepaid/gift-cards/faqs.html> (17 pages).
Groupon: FAQ [online] [retrieved on Jul. 11, 2012]. Retrieved from the Internet: <URL:http://www groupon.com/faq> (12 pages).
Groupon: Give the gift of Gropuon [online] [retrieved on Jul. 11, 2012]; Retrieved from the Internet: <URL:http://www.groupon.com/giftcards> (3 pages).
Groupon: Groupon Now!™ Frequently Asked Questions [online] [retrieved on Jul. 11, 2012], Retrieved from the Internet: <URL:http://www.groupon.com/pages/groupon-now-faq> (6 pages).
Groupon: Howto Redeem Groupons [online] [retrieved on Jul. 11, 2012]. Retrieved from the Internet: <URL:http://www.groupon.com/pages/how-to-redeem> (5 pages).

* cited by examiner

GRAPHICAL USER INTERFACE WITH DYNAMICALLY CHANGING PROXIMITY-BASED TILES

CROSS-REFERENCE TO RELATED APPLICATIONS

This application is a continuation of U.S. patent application Ser. No. 15/246,206, filed on Aug. 24, 2016, entitled "Graphical User Interface with Dynamically Changing Proximity-Based Tiles," currently pending, which is a continuation of U.S. patent application Ser. No. 14/819,833, filed on Aug. 6, 2015, entitled "Graphical User Interface with Dynamically Changing Proximity-Based Tiles," now abandoned, which is a continuation of U.S. patent application Ser. No. 13/467,199 filed May 9, 2012, entitled "Graphical User Interface with Dynamically Changing Proximity-Based Tiles," now abandoned, the entire contents of all of which are incorporated by reference herein.

TECHNICAL FIELD

The present disclosure relates generally to portable electronic devices and, more particularly, to software applications for conducting actions using mobile computing and cellular devices.

BACKGROUND OF THE INVENTION

Various forms of electronic payment instruments, such as credit cards, debit cards, pre-paid value cards, cash cards, gift cards, gift certificates, and the like, have been used to facilitate commercial transactions, including web-based (e.g., "e-commerce") transactions and brick-and-mortar (e.g., "store front") transactions. Conventional pre-paid payment mechanisms are typically acquired by a purchaser for value from a seller. The seller can take on various known forms, such as banks and other financial institutions, retailers, online institutions, and other types of entities. The purchaser typically provides value (e.g., currency) to the seller and, in exchange, is issued a pre-paid payment instrument, e.g., by delivering or otherwise associating the value with a pre-paid payment instrument. Traditionally, once the seller completes the initial transaction of selling and providing the pre-paid payment instrument to the purchaser, the seller tracks purchases against currency value attributed to the pre-paid payment instrument.

In a conventional gift card scenario, the originating purchaser is required to travel in person to a brick-and-mortar store and purchase a card that is associated with a certain amount of stored value. Once acquired, the originating purchaser must then mail or otherwise deliver the gift card to the intended recipient, who typically redeems the value of the gift card by traveling to the store, picking out an item for purchase, and presenting the gift card at a point-of-sale terminal as a form of payment. Generally speaking, this scenario is inconvenient for both the originating purchaser and the recipient because of the additional personal time and money required to travel to the store for the original purchase of the gift card as well as subsequent purchases with the gift card. Even for the merchant, this situation may be undesirable due to avoidable overhead costs and personnel time associated with stocking, displaying and selling gift cards. Moreover, gift card redemption is typically limited to a single retailer such that the gift card can be redeemed at that retailer's stores only.

With the advent of the internet and the World Wide Web, internet-based "online" systems enable shoppers to purchase items, such as gift cards or prepaid cards, from home using personal credit cards and a personal computer. In a typical online gift card purchase, the purchaser is required to access a specific website for a desired online retailer, navigate the website to determine where gift cards are available for purchase, choose a gift card and associated value, enter personal shipping and billing information, and, once the transaction is complete, then wait for the gift card to be delivered. The processes and interfaces for purchasing gift cards from an online retailer can oftentimes be confusing and time consuming. Moreover, the originating purchaser or the intended recipient must wait until the gift card is shipped and received before they can redeem the value of the card. In addition, a purchaser is generally required to visit multiple websites and systematically repeat all of the foregoing steps for each retailer from which they wish to purchase a gift card. And almost without exception, gift cards are only available for purchase with credit cards or other forms electronically transferred currency.

In addition, some points providers offer a direct exchange of reward points to prepaid instruments offered by the same points provider. The points providers therefore control the conditions and restrictions under which the reward points or gift cards can be exchanged, and also require a consumer to conduct the transaction on the point provider's website. What is needed is a way of converting reward points issued by a points provider to a virtual gift card issued by a prepaid instrument provider that is not affiliated with the points provider (e.g., the issuer of rewards points is a different entity from the issuer of the virtual gift card), and allowing a consumer to redeem the virtual gift card for a good or service offered by a merchant, all using a portable electronic device such as a smartphone. What is needed is a way of using reward points issued by a points provider at a point-of-sale terminal of a merchant for a good or service, or of exchanging reward points directly for a good or service at a merchant or for a promotional item. What is needed is a way of drawing customers to brick-and-mortar stores and incentivizing them to make purchases there by grabbing their attention as they approach the vicinity of the store's location. These and other needs are fulfilled by aspects of the present disclosure.

BRIEF SUMMARY OF THE INVENTION

Aspects of the present disclosure are directed to a method of executing a software application on a portable electronic device with a display device and a user input device. The method includes: determining, via the portable electronic device, a location of the portable electronic device; displaying, via the portable electronic device's display device, a plurality of user-selectable options within a predetermined proximity of the location of the portable electronic device; receiving, via the portable electronic device's user input device, a selection corresponding to at least one of the user-selectable options; displaying, via the display device, a number of server stored points accumulated by the user of the portable electronic device with a third-party computer system; displaying, via the display device, an exchange number for a subset of the accumulated server stored points to complete an electronic-based wireless action with the selected option; and, in response to a request received via the user input device, authorizing the electronic-based wireless action with the selected one of the user-selectable options for the exchange number of the subset of the accumulated server stored points.

Additional aspects of the present disclosure are directed to a computer program product for a portable electronic device. The computer program product includes one or more non-transient computer-readable media including instructions which, when executed by one or more processors, cause the one or more processors to operate with one or more input devices and one or more display devices to: display a plurality of merchants within a predetermined proximity of a predetermined location of the portable electronic device; display a selection corresponding to at least one of the merchants; display a balance of virtual rewards points available for redemption by a user of the portable electronic device; display an exchange value of the virtual rewards points for making a purchase associated with the selected at least one merchant; and, in response to receipt of an indication of a purchase request, authorize deduction of the exchange value from the balance of the virtual rewards points and provide confirmation of the purchase associated with the selected at least one merchant.

According to other aspects of the present disclosure, a system is presented for conducting a commercial transaction using a portable electronic device with a display device and a user input device. The system includes one or more processors communicatively coupled to the portable electronic device, and a dedicated software application on the portable electronic device. The dedicated software application is configured to: in cooperation with the display device, display a plurality of merchants within a predetermined proximity of a predetermined location of the portable electronic device; receive, from the user input device, an indication of a selection corresponding to at least one of the merchants; receive, from the one or more processors, data indicative of a balance of virtual rewards points available for redemption by a user of the portable electronic device; in cooperation with the display device, display the balance of virtual rewards points, one or more purchases which can be acquired with the balance of virtual rewards points, and, for each of the displayed one or more purchases, a corresponding exchange value of the virtual rewards points for making the purchase from the selected at least one merchant; receive, from the user input device, an indication of a purchase request for at least one of the one or more purchases; and, in response to the purchase request, send a signal to the one or more processors to deduct the exchange value from the balance of the virtual rewards points and complete the purchase with the selected at least one merchant.

Aspects of the present disclosure are also directed to a method of automatically converting rewards points to a virtual prepaid instrument using a portable electronic device having a display device and a user input device. This method includes: receiving over a wireless network at a portable electronic device a balance of rewards points associated with a user account stored on a points provider server remote from the portable electronic device, the rewards points being non-currency and convertible by a user of the user account to an amount of currency commensurate with the balance of reward points; responsive to receiving the balance of the reward points, receiving from the user input device an indication of a desired amount of currency to exchange for a corresponding number of the rewards points; the portable electronic device communicating over the wireless network the desired amount of currency and a merchant identification directly or through a host server to a stored value prepaid instrument provider server, the merchant identification being associated with a merchant at which a good or a service at a point-of-sale terminal at a physical location of the merchant is offered for purchase or exchange, the prepaid instrument provider server (a) being remote from the points provider server such that an issuer of the rewards points is a distinct entity from an issuer of a virtual prepaid instrument, (b) generating a code associated with the virtual prepaid instrument, and (c) associating with the code at least the desired amount of currency as a stored value associated with the virtual prepaid instrument; displaying on the display device a representation of the code and the stored value associated with the virtual prepaid instrument; in response to the representation of the code being presented at the point-of-sale terminal for purchasing the good or the service for a purchase price, deducting the purchase price from the stored value to produce a modified stored value and displaying the modified stored value on the display device; and, the portable electronic device communicating over the wireless network the purchase price or the modified stored value directly or through the host server to the prepaid instrument provider server to cause the prepaid instrument provider server to modify the stored value to the modified stored value.

Also disclosed herein is a method of automatically exchanging rewards points using a portable electronic device having a display device and a user input device. The method includes receiving over a wireless network at a portable electronic device a balance of rewards points associated with a user account stored on a points provider server remote from the portable electronic device, the rewards points being non-currency and convertible by a user of the user account to an amount of currency commensurate with the balance of reward points; responsive to receiving the balance of the reward points, receiving from the user input device an indication of a desired amount of currency to exchange for a corresponding number of the rewards points; the portable electronic device communicating to a host server over the wireless network the desired amount of currency and a merchant identification, the merchant identification being associated with a merchant having a point-of-sale terminal at a physical location of the merchant, the host server being remote from the points provider server and operated by an entity different from an entity that operates the points provider server; storing on the host server the desired amount of currency as a stored value; displaying on the display device a representation of the code and the stored value; in response to the representation of the code being presented at the point-of-sale terminal for an item of value, deducting the value of the item from the stored value to produce a modified stored value and displaying the modified stored value on the display device; and, the portable electronic device communicating to the host server over the wireless network the modified stored value to cause the host server to modify the stored value to the modified stored value.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of the exemplary embodiments and modes for carrying out the present invention when taken in connection with the accompanying drawings and appended claims.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

Figure 1:
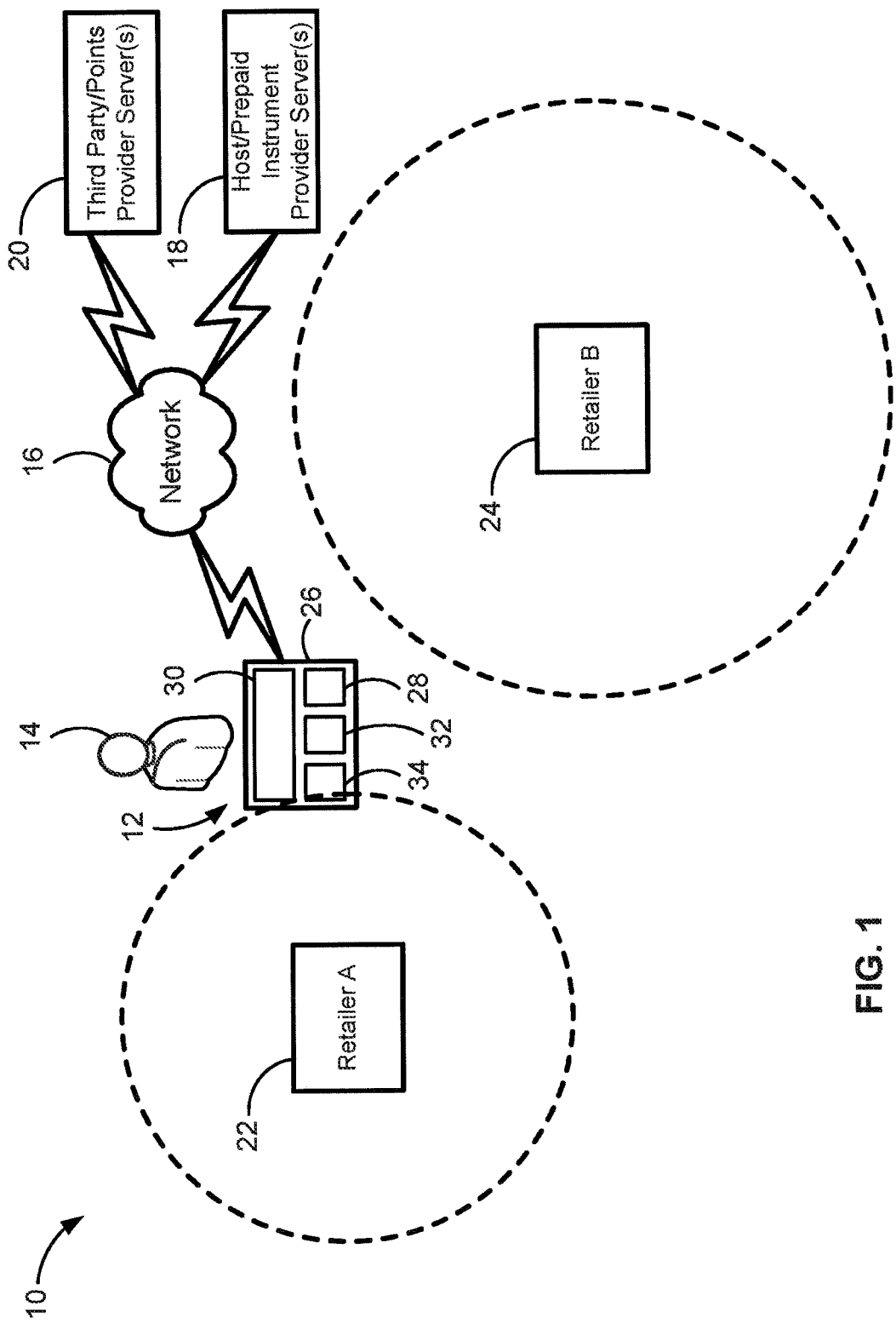
FIG. 1 is a diagrammatic illustration of a representative system for conducting a transaction using a portable electronic device in accordance with aspects of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of the invention as defined by the appended claims.

DETAILED DESCRIPTION OF THE PREFERRED EMBODIMENTS

While the present disclosure is susceptible of embodiment in many different forms and aspects, there are shown in the drawings and will herein be described in detail aspects of the present disclosure with the understanding that it is to be considered as an exemplification of the principles of the invention or inventions disclosed herein and is not intended to limit the broad aspects illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed, the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or any logical combination thereof, for example.

Referring now to the drawings, wherein like reference numerals refer to like components throughout the several views, FIG. 1 illustrates an exemplary wireless communications system and network, designated generally as 10, for conducting a commercial transaction using a portable electronic device 12 in accordance with aspects of the present disclosure. The system 10 includes, but is not limited to, the portable electronic device 12, which is operated by a user or client 14, a communications network 16, and one or more servers 18 and 20, and one or more participating retailers or merchants 22 and 24. It should be readily understood that the system 10 illustrated in FIG. 1 is merely provided as an exemplary application by which the various inventive aspects and features of this disclosure can be applied.

Moreover, only selected components of the system 10 have been shown and will be described in additional detail herein below. Nevertheless, the systems and devices discussed herein can include numerous additional and alternative features, and other well-known peripheral components, for example, for carrying out the various methods and functions disclosed herein. Those components which are not necessary for carrying out the aspects of the present disclosure will not be described in further detail.

The communications network 16 can be a wired or a wireless network, or a combination of wired and wireless technology. In at least some aspects, most if not all of the transaction functions (e.g., purchasing) described herein by the portable electronic device 12 can be conducted over a wireless network, such as a WLAN or cellular data network, to ensure freedom of movement of the user and device 12. In some implementations, the system 10 can be a web-based system where users or clients 14 use internet-based websites and/or web-based applications to access the transaction features disclosed herein. In various aspects, the portable electronic device 12 includes a web browser or a dedicated, standalone application software, or a combination of both. A web browser typically allows the user 14 to search for and/or request a web page (e.g., from the server 18) with a web page request. A web page, in a non-limiting example, is a data file that includes computer executable or interpretable data, graphics, text, video, and/or sound, that can be executed, displayed, played, processed, streamed, and/or stored, and that can contain links to other web pages. In some embodiments, a user manually requests a web page from the server 18. Alternatively, the dedicated transaction software automatically makes requests with the web browser. Examples of commercially available web browser software include, but are certainly not limited to, FIREFOX, available from the Mozilla Corp., of Mountain View, Calif., SAFARI available from Apple, Inc., and INTERNET EXPLORER, available from Microsoft Corp., of Redmond, Wash. In one implementation, the portable electronic device 12 can connect to the network 16 over a cable, which can pertain to a peripheral bus such as a USB or Firewire® (IEEE-1394) connection.

The communications network 16 connects the user 14, through operation of the portable electronic device 12, with one or more servers 18 and 20. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on. The network 16, in at least some embodiments, can typically carry Transmission Control Protocol/Internet Protocol (TCP/IP) protocol communications, and HTTP/HTTPS requests made by a web browser and associated responses and replies, and the connection between client software and a server can be communicated over such TCP/IP networks. Some non-limiting examples of networks that can serve as the communications network 16 include a wireless or wired Ethernet-based intranet, a local or wide-area network (LAN or WAN), and/or the global communications network known as the Internet, which can be configured to accommodate many different communications media and protocols.

The dedicated transaction or application software can be implemented in various forms. For instance, the dedicated transaction software or application software can be in the form of a web-based (e.g., Java) applet that is downloaded to the portable electronic device 12 and runs in conjunction with a web browser on the portable electronic device 12. Optionally, the dedicated transaction software can be in the form of a standalone software application, which can be implemented in a multi-platform language such as .Net or Java, or in native processor executable code. If executed on the portable electronic device 12, the dedicated transaction software can be operable to open a network connection with the servers 18, 20 over the communications network 16 and, thus, communicates via that connection with the server servers 18, 20. In some embodiments, the dedicated transaction software of the portable electronic device 12 communicates with a single "host" or "client" server 18, which in turn conducts any necessary communications with one or more "third party" servers 20 to complete a particular transaction. Optionally, the dedicated transaction software and web browser can be part of a single client-server interface, where the software can be implemented as a "plug-in" to the web browser, for example. Other optional variations and known alternatives are considered to be within the scope and spirit of the present disclosure. The host server can include one or more servers, such as a host server and a prepaid instrument provider server, such as a server operated by First Data Corporation's merchant processing service. In some implementations, the host server can carry out the functions of a prepaid instrument provider server, or the host server can interface with a remote prepaid instrument provider server, which manages and stores gift cards and their associated account information including balances. An example of a host server is a digital gifting platform operated by CashStar, Inc., the assignee of the present disclosure. The third party servers 20 can include more than one third party server (e.g., a third party relative to the prepaid instrument provider), such as a points provider server, which is not affiliated with the host/prepaid instrument provider server 18. In other words, the issuer of reward points stored on the points provider server 20 is not the same entity as the issuer of the prepaid instruments stored on the prepaid instrument provider server 18. The reference numbers 18 and 20 each generally designates one or more servers.

In the illustrated system, the network 16 is used to securely communicatively couple the portable electronic device 12 to one or more of the servers 18, 20. Each server 18, 20 can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers 18, 20 can each be part of a logical group of one or more servers, such as a server farm or server network. As is typical in large-scale systems, the application software can be implemented in components, with different components running on different server computers, on the same server, or any logical combination thereof Although FIG. 1 illustrates a single portable electronic device 12 communicating with a single host server 18 over a single network 16 to execute a transaction with a single retailer 22, it should be understood that the system 10 can support numerous portable electronic devices 12 operating over one or more networks 16 to conduct transactions with an array of retailers 22 through a variety of host servers 18 and third party servers 20.

The portable electronic device 12 comprises a housing or casing 26 and includes one or more input devices 28, which can include various devices such as a keyboard, buttons on a button panel, a single- or multi-touch screen, a track ball, a track pad, a microphone, or voice and/or gesture recognition software and hardware. For output, the portable electronic device 12 can include, in a few examples, a display device 30, which can include a high-resolution liquid crystal display (LCD) panel, a plasma display, or a light emitting diode (LED) or organic LED (OLED) display, one or more speakers, one or more user-accessible ports (e.g., an audio output jack for headphones, a video headset jack, etc.), and other conventional I/O devices and ports. The primary display device 30 can be configured to display aspects of the dedicated transaction software, which can take on the form of a dedicated mobile software application (or "app"), as well as other tangential features, functions and information, such as text messaging, emails, alerts and announcements, personal information, advertisements, and the operating status of the portable electronic device 12. In some embodiments, the portable electronic device 12 can also include a location tracking device 34, which can include a global positioning system (GPS) receiver. Examples of some portable electronic devices include, but are not limited to, cellular phones and smartphones, laptop computers, tablet computers (e.g., the Samsung GALAXY TAB tablet device and the Apple IPAD tablet device), e-readers (e.g., the KINDLE electronic reader device), personal digital assistants (PDA), etc. By portable, it is meant that the device can be comfortably held in the hand or hands of an adult human and weighs a couple to a few pounds.

In some embodiments, the user-input device(s) 28 accept(s) user input(s) and transforms the user input(s) to electronic data signals indicative of input or inputs, which can correspond to an enabled feature for such input(s) at a time of activation. The input(s), once transformed into electronic data signals, can be outputted to a central processing unit (CPU) or controller 32 for processing. The electronic data signals can correspond to an electrical current, an electrical voltage, an electrical charge, an optical signal, or a magnetic signal.

To enhance security, a transaction with the portable electronic device 12 can be optionally enabled only by an authentication process in which a primary or secondary source confirms the identity of the user 14. Upon entry of user identification information, for example, such as a password, PIN number, credit card number, personal information, biometric input, predefined key sequences, etc., the user can be permitted to access a user account. Thus, a transaction can be enabled by, for example, a combination of personal identification input (e.g., mother's maiden name) with a secret PIN number, or a combination of a password and a corresponding PIN number, or a combination of a credit card input with secret PIN number. Other conventional security or authentication features can be utilized to prevent unauthorized access to a user's account, for example, to minimize an impact of any unauthorized access to a user's account, or to prevent unauthorized access to any personal information or funds accessible via a user's account.

The various components of the portable electronic device 12 are controlled by one or more processors (e.g., CPU, distributed processors, etc.) 32, also referred to herein generally as a controller (e.g., microcontroller, microprocessor, etc.). The controller 32 can include any suitable processor(s). By way of example, the controller 32 can include a plurality of microprocessors including a master processor, a slave processor, and a secondary or parallel processor. Controller 32, as used herein, can comprise any combination of hardware, software, and/or firmware disposed inside and/or outside of the housing 26 of the device 12 that is configured to communicate with and/or control the transfer of data between the portable electronic device 12 and a bus, another computer, processor, or device and/or a service and/or a network. The controller 32 is generally operable to execute any or all of the various computer program products, software, applications, algorithms, methods and/or other processes disclosed herein. The controller 32 can include a memory device or can be coupled to a memory device, which can comprise a volatile memory (e.g., a random-access memory (RAM) or multiple RAM) and a non-volatile memory (e.g., an EEPROM).

Location and movement of the portable electronic device 12 can be tracked via a location tracking device 34, which can reside in the portable electronic device 12. As indicated above, the location can be determined through a satellite-based GPS navigation system. Even without a GPS receiver, the portable electronic device 12 can provide location and movement information through cooperation with a cellular system through a process known as "trilateration." A cellular system's towers and base stations communicate radio signals and are arranged into a network of cells. A cellular device, such as cellphones, smartphones and cellular-enabled tablet computers, have low-power transmitters for communicating with the nearest tower, base station, router, or access point. As a user moves with the cellular device, e.g., from one cell to another, the base stations monitor the strength of the transmitter's signal. When the cellular device moves toward the edge of one cell, the transmitter signal strength diminishes for a current tower. At the same time, the base station in the approaching cell detects a strength increase in the signal. As the user moves into a new cell, the towers transfer the signal from one to the next. A computer can determine the location of the device based on measurements of the transmitter signal, such as the angle of approach to the cell tower(s), the time it takes the signal to travel to multiple towers, and the strength of the signal when it reaches the towers. According to other aspects of at least some embodiments of the present concepts, a movement sensor can be provided comprising one or more sensors configured to determine the movement (e.g., rotation, translation, etc.) of the portable electronic device 12 with respect to an established datum or reference (e.g., position, spatial orientation, reaction, force, velocity, acceleration, electrical contact, etc.) about or along one or more axes.

Figure 2:
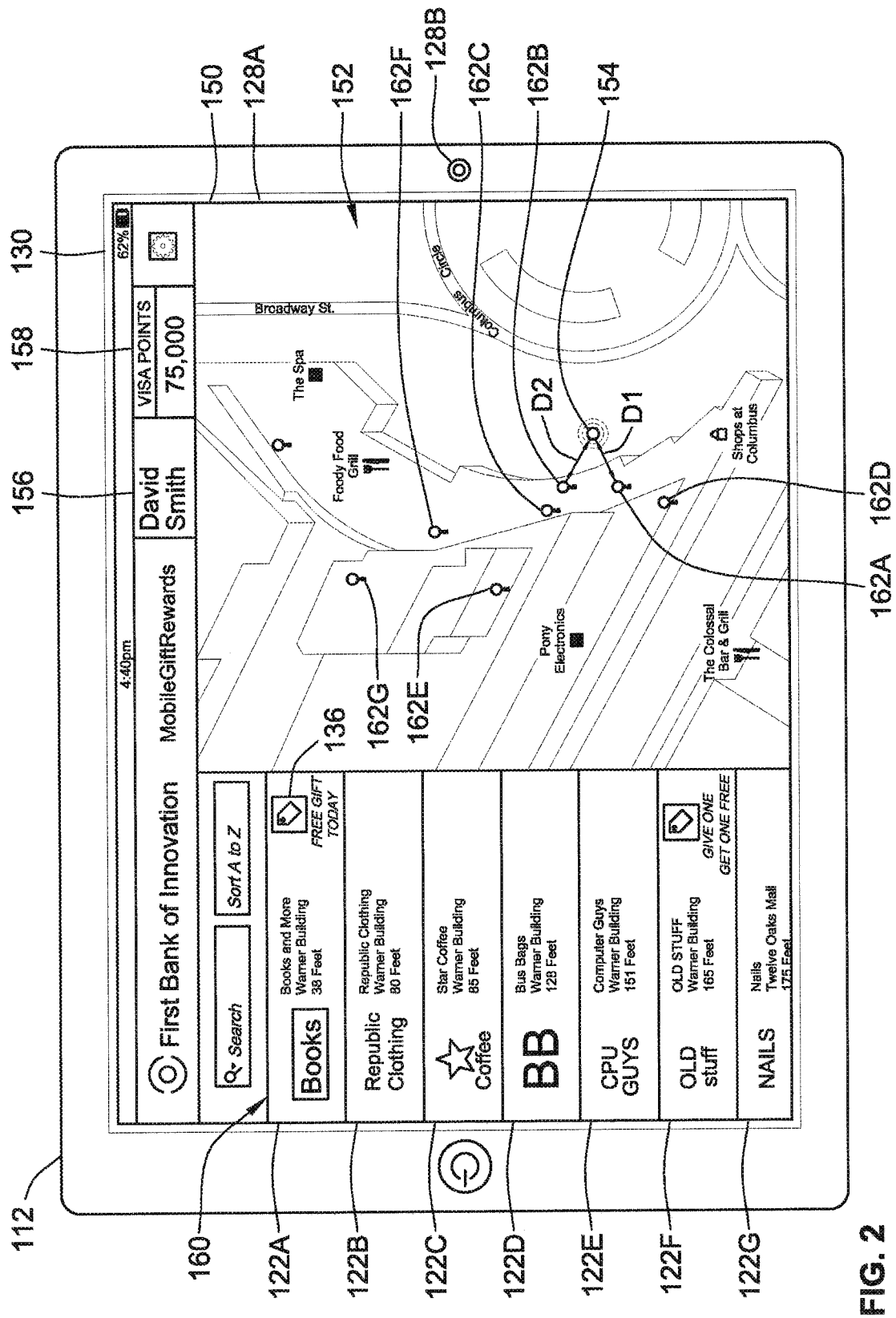
FIG. 2 is a plan-view illustration of an exemplary portable electronic device with a software application in accordance with aspects of the present disclosure.

FIG. 2 provides a more specific example of a portable electronic device, which is illustrated as a WiFi-enabled and cellular-enabled tablet computer 112 with an LCD display panel 130 and one or more input devices, which in this example includes a touch screen (or "touchscreen") 128A and a video camera 128B. The portable electronic device 112 of FIG. 2 can take on any of the various forms, optional configurations, and functional alternatives described above with respect to the aspects exemplified in the portable electronic device 12 of FIG. 1, and thus can include any of the corresponding options and features. For instance, the portable electronic device 112 can communicate with one or more servers (e.g., servers 18 and 20 of FIG. 1) via a wireless network (e.g., network 16 of FIG. 1) in any of the manners described above. Likewise, the software application 150 of FIG. 2 can take on any of the various forms and optional alternatives described above.

Downloaded to or otherwise available on the portable electronic device 112 is a software application for conducting commercial transactions disclosed herein, which is portrayed as a dedicated mobile software application 150 (more commonly known as a "mobile application" or just "app"). In the illustrated embodiment, the software application 150 presents various types of information to the user, including the time, remaining battery power, and a map 152 with a symbol, avatar or icon 154 representing the location and movement of the user and portable electronic device 112. Also displayed is user information 156 (e.g., the user's name) and a balance of virtual rewards points 158 available for redemption by the user of the portable electronic device 112. Some embodiments can allow the user to select from a variety of different rewards points available for redemption (e.g., DELTA SKYMILES®, HOLIDAY INN® PRIORITY CLUB Reward Points, and VISA® Signature points). The user links one or more reward points account to the software application 150, which communicates with a points provider server, such as the sever 20, to authenticate the user's reward points account and return a balance of reward points associated with the user's reward points account.

Rewards points (also called loyalty points) are typically issued by an entity as part of a customer loyalty program that is designed to reward customers for making purchases from the same merchant or company or for making purchases using the same media. Loyalty programs can be initiated by businesses to actively cultivate loyalty amongst customers to ensure they continue patronizing the business, as well as to acquire information relating to customer spending habits. Loyalty programs can be structured marketing efforts that reward, and therefore encourage, continued and regular buying behavior with a particular business. In addition to reward points, loyalty programs can offer prizes, discounts, and other inducements designed to incentivize repeat business from customers. Loyalty programs span through a broad spectrum of industries, including, in some non-limiting examples, frequent-flyer programs for airline customers, gas cards for gas station patrons, rewards cards that accumulate reward points for repeated use of a credit or debit card, priority club programs for hotel reservations and automobile rentals, and customer loyalty programs for restaurants, hardware stores, grocery stores, electronic stores, department stores, etc., or for frequent use of a website or online service.

Also presented by the software application 150 of FIG. 2, through cooperation with the display device 130, is a number of merchants 122A-G (e.g., retailers, wholesalers, dealers, consignors, vendors, brokers, etc.) that are available for participation in a Mobile Gift Rewards program, which will be described in further detail below. Some embodiments also display the respective location of each merchant 122A-G on the map 152 using a graphic (e.g., using a corresponding graphical pin 162A-G for each merchant 122A-G, respectively), and the location of the portable electronic device 112 relative to the merchants 162A-G, for example, by via placement and movement of the icon 154. In some embodiments, the displayed merchants 122A-G are those within a predetermined proximity (e.g., X number of feet, Y number of miles, Z number of minutes drive, etc.), such as a radius, of the current location of the portable electronic device 112. Optional arrangements can limit the displayed merchants 122A-G to those that are within a user-selected proximity of the current location and/or within a predetermined proximity of a user-selected future location of the portable electronic device 112. Some embodiments can require the individual merchants be registered and/or pay a fee to participate in the Mobile Gift Rewards program and, thus, be displayed by the software application 150. As yet another option, an individual retailer can pay a fee to ensure they are always shown, prioritized, or both, by the software application 150.

The merchants 122A-G are shown arranged in a hierarchy or list 160 that is based, at least in part, on a respective distance of each merchant 122A-G from the location of the portable electronic device 112. For example, each merchant 122A-G is represented in FIG. 2 by a respective merchant tile, which includes merchant-specific information, such as the merchant's name, logo, location, and distance from the portable electronic device, for example. The merchant tiles 122A-G are shown arranged in descending order on the display panel 130 from top-to-bottom in order of closest-to-furthest. The first merchant 122A—Books and More—is located in the Warner Building and is the closest to the determined location of the portable electronic device 112 (e.g., the distance D1 of the first merchant 122A is 38 feet away in FIG. 2), and is therefore shown at the top of the hierarchy 160. According to the illustrated example, the first merchant 122A is running a promotional marketing program offering a FREE GIFT TODAY, which is displayed on the first tile and highlighted by a promotional tag 136. The second merchant 122B—Republic Clothing—is also located in the Warner Building, but is a distance D2 of 80 ft. away from the portable electronic device 112, and is therefore positioned as second from the top of the hierarchy 160 in FIG. 2. In accordance with this scheme, the third merchant 122C is further from the portable electronic device 112 than the first and second merchants 122A, 122B, but closer than the fourth, fifth, sixth and seventh merchants 122D, 122E, 122F, and 122G, respectively, and is therefore shown third from the top of the hierarchy 160. The remaining four merchants 122D-G are also arranged in descending order from top-to-bottom in order of closest-to-furthest. The hierarchy 160 can be an ordered list of merchants, ranked by proximity to the location of the portable electronic device 112. Alternately, the hierarchy 160 can have a hierarchical layout having multiple levels in which multiple merchants can be arranged on the same level. Merchants can be ranked according to a characteristic, such as proximity to the portable electronic device 112 or type or category of good or service offered. For example, during mealtimes, restaurant or food eateries can be organized at the top of the hierarchy 160 on the same level and displayed left to right in proximity to the portable electronic device 112. Clothing merchants can be organized on a lower level of the hierarchy, but re-ranked to a higher level outside of mealtimes. Within each level, merchants can be ranked according to their proximity to the portable electronic device 112. The arrangement of the merchants varies in real time as a function of the time of day or the location of the portable electronic device relative to the merchants or both.

Figure 3:
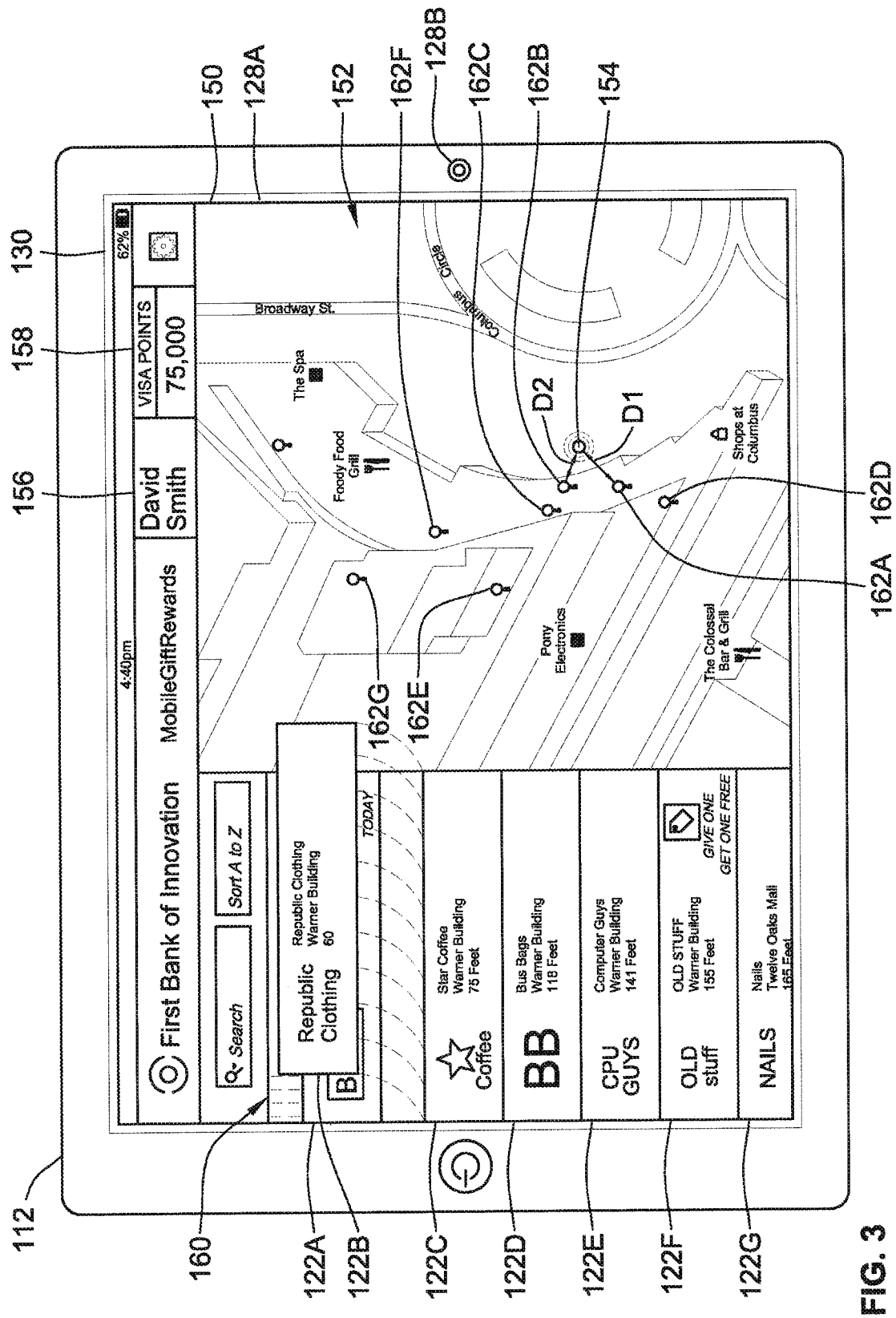
FIG. 3 is another plan-view illustration of the portable electronic device of FIG. 2 showing a screen shot of the software application which is displaying a hierarchy of participating merchants automatically updating in response to movement of the portable electronic device.
Figure 4:
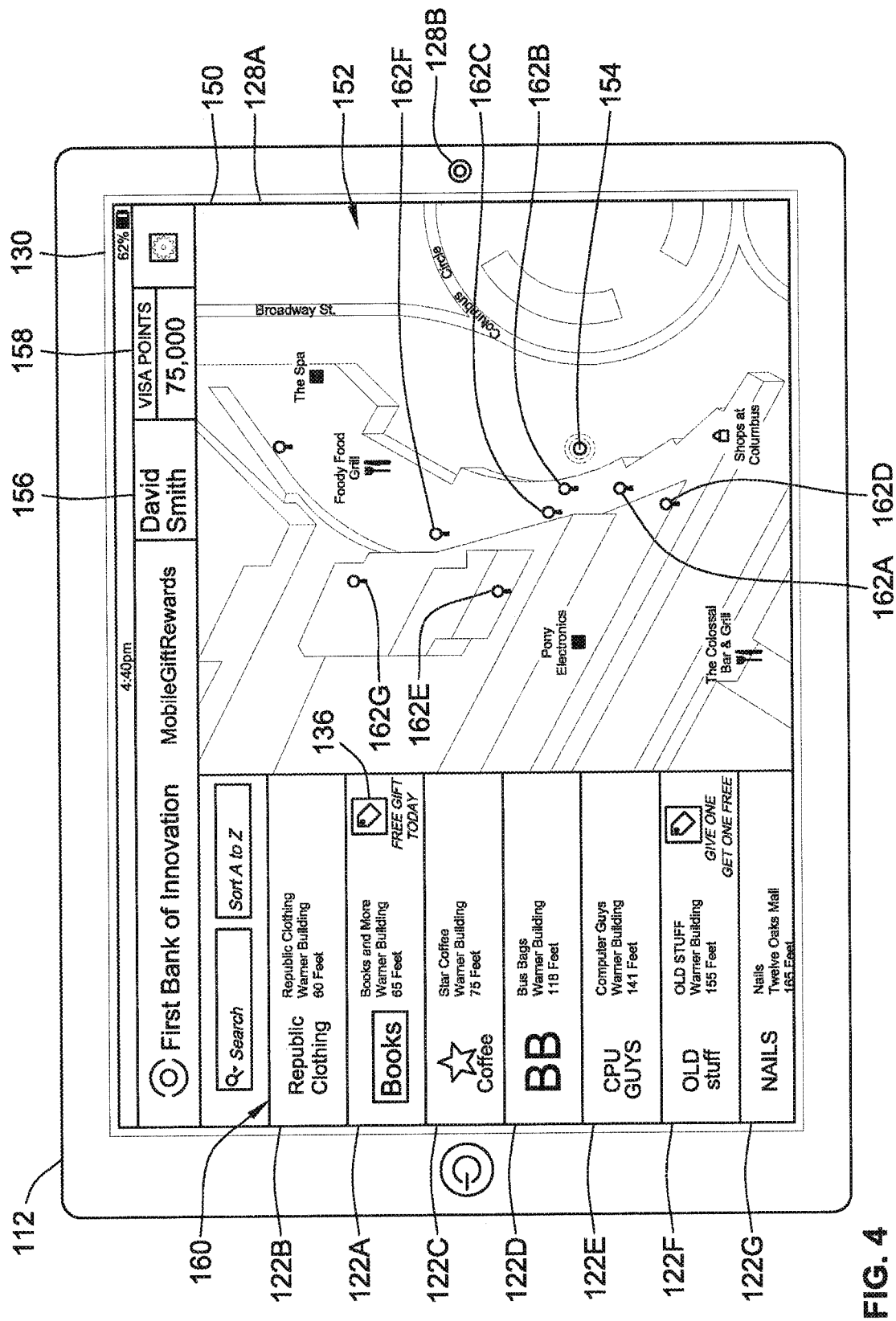
FIG. 4 is another plan-view illustration of the portable electronic device of FIG. 2 showing a screen shot of the software application which is now displaying the hierarchy of participating merchants after being automatically updated.
Figure 5:
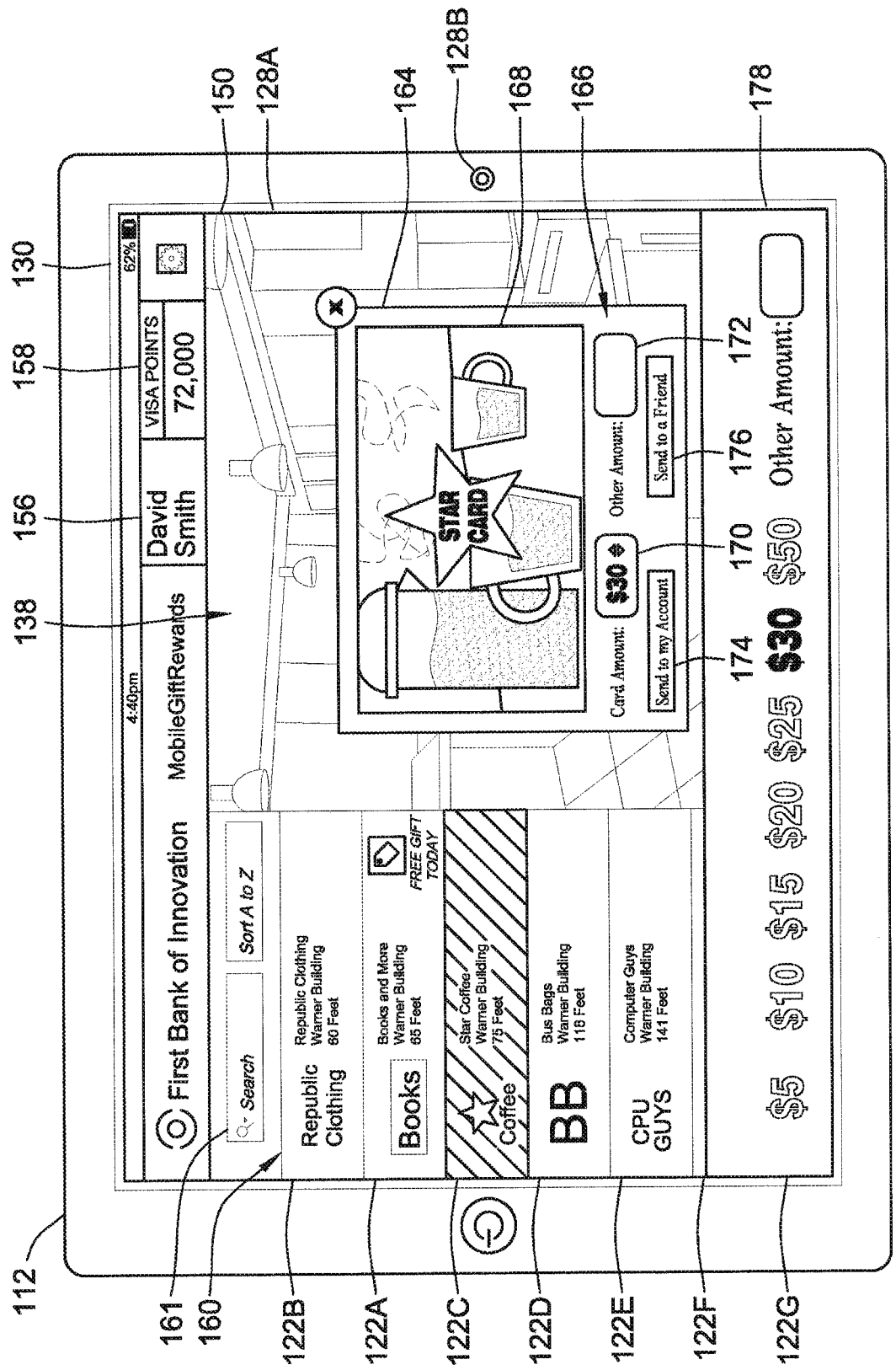
FIG. 5 is another plan-view illustration of the portable electronic device of FIG. 2 showing a screen shot of the software application which is now displaying a balance of available virtual rewards points and various purchases that can be acquired with the available balance of virtual rewards points.

As described above during the description of the portable electronic device 12 of FIG. 1, the location and movement of the portable electronic device 112 of FIGS. 2-7 can be tracked, monitored, or otherwise determined, for example, via GPS tracking, cellular trilateration, movement sensors, or through any other suitable location tracking system. In so doing, the displayed hierarchy 160 of merchants 122A-G can be automatically updated in response to a determination that the portable electronic device 112 moved from a first "start" location (e.g., FIG. 2) to a second "new" location (e.g., FIG. 3) whereby the distances between the merchants 122A-G and the device 112 change. By way of non-limiting example, when it is determined that the portable electronic device 112 moves from its initial location in FIG. 2, closest to the store or kiosk location of the book merchant Books and More 162A, to a new location in FIG. 3, closest to the store or kiosk location of the clothing merchant Republic Clothing 162B, the movement can be shown in real time by repositioned the icon 154 on the map 152 of the software application 150. Books and More 162A (the first merchant 122A) is now a new distance D1' of 65 ft. away from the portable electronic device 112, while Republic Clothing 162B (the second merchant 122B) is now a new distance D2' of 60 ft. away from the portable electronic device 112. To reflect this change in proximity, the second merchant 122B is displayed in real time via the software application 150 as being moved the top of the hierarchy 160 while the first merchant 122A is contemporaneously moved down one spot below the second merchant 122B on the hierarchy 160. At the same time, the distances of the other merchants 122C-G are also automatically updated in real time to reflect the change in proximity to the portable electronic device 112. FIG. 4 provides a screen shot of the software application 150, which is now displaying the hierarchy 160 of participating merchants 122A-G after being automatically updated in real time to reflect the new closest merchant to the portable electronic device 112. As the user walks toward one of the merchants, a notification from a merchant can be pushed to the portable electronic device 112 and displayed on its display device 130, where the notification informs the user of a deal or special offer or promotion available from the merchant or at the merchant's nearby store. Merchants can pay to have these notifications pushed to nearby portable electronic devices 112, which will cause the notifications to be displayed on the display device 130, for example, in a pop-up window.

Figure 6:
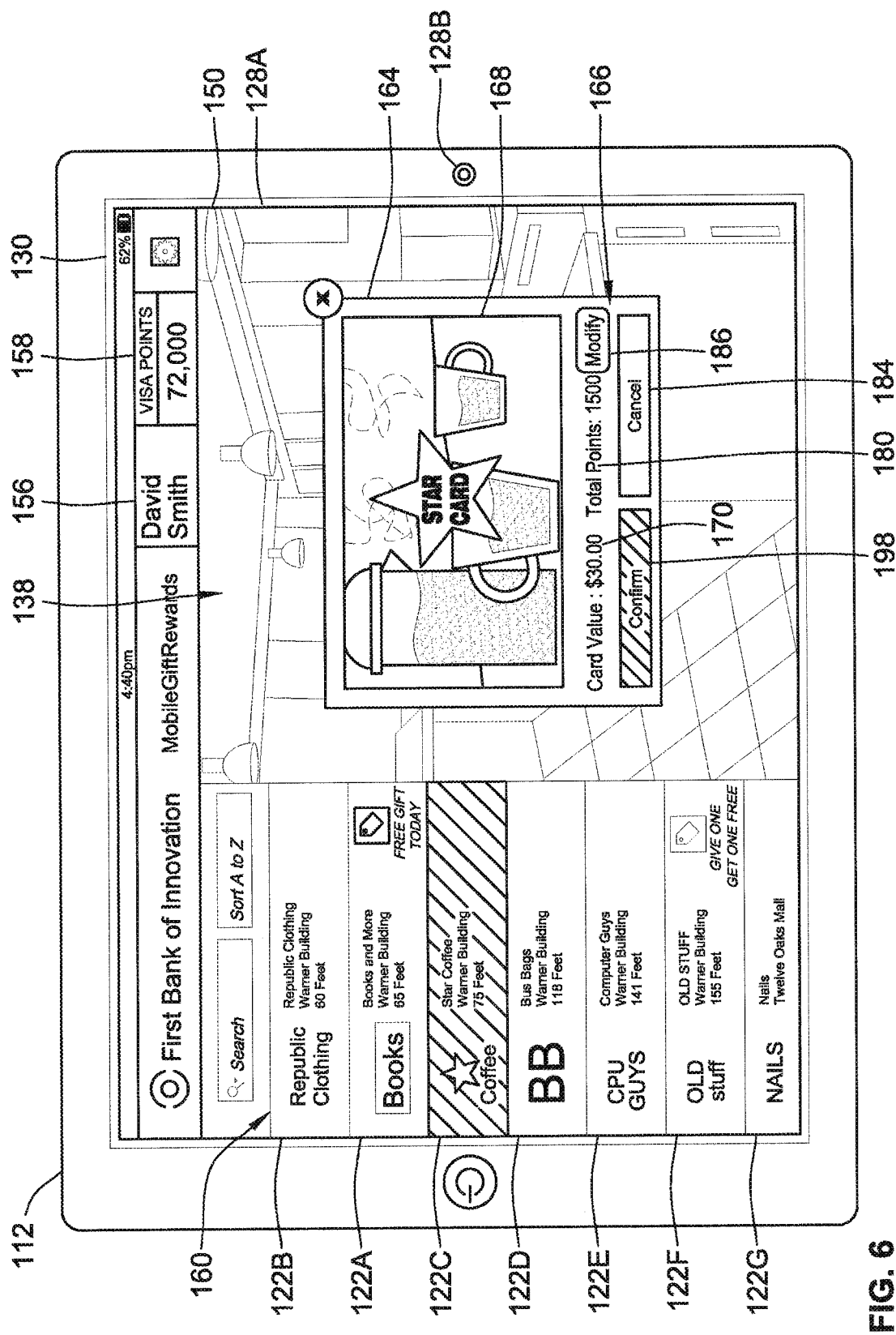
FIG. 6 is another plan-view illustration of the portable electronic device of FIG. 2 showing a screen shot of the software application which is now displaying a purchase request.
Figure 7:
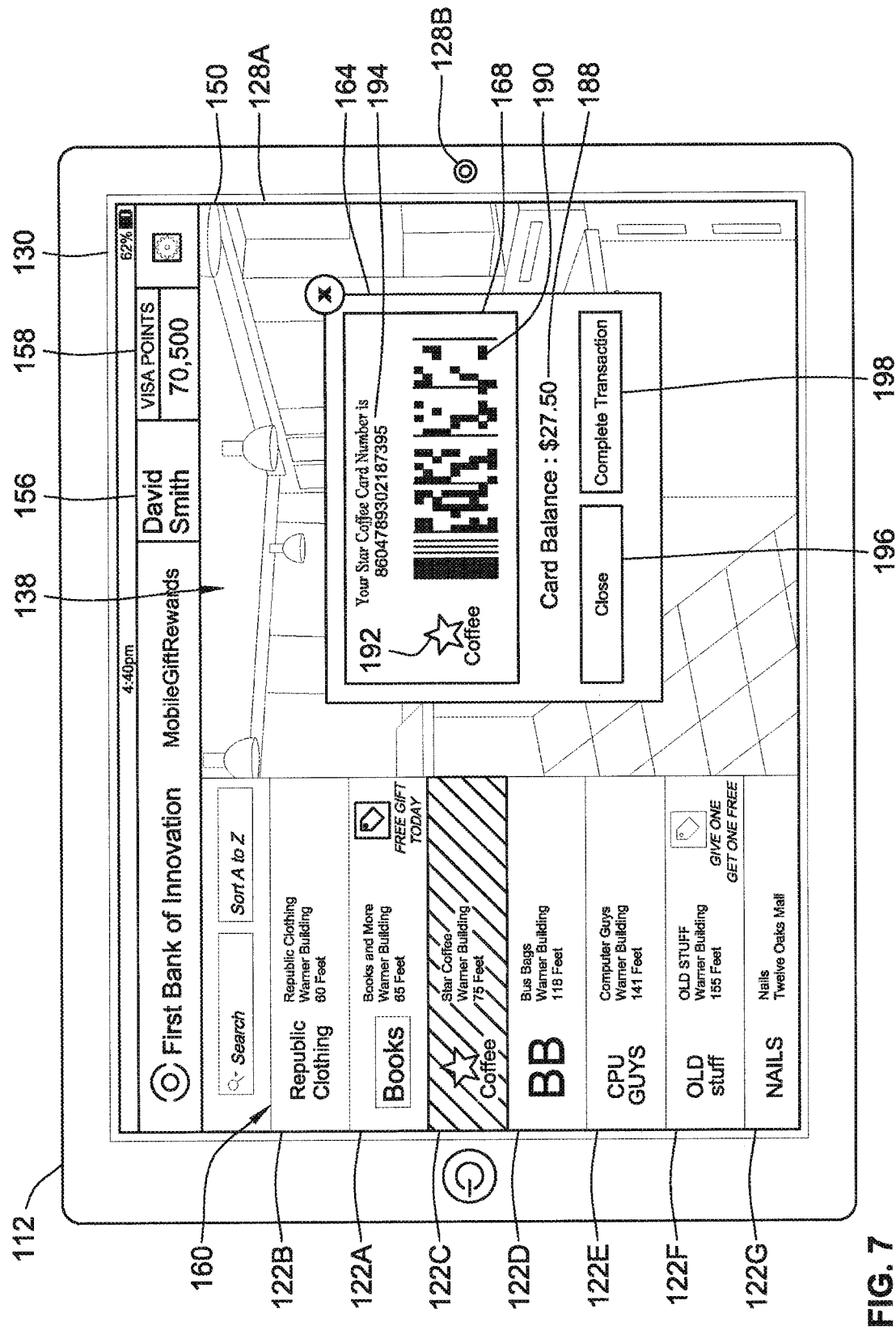
FIG. 7 is another plan-view illustration of the portable electronic device of FIG. 2 showing a screen shot of the software application which is now displaying the remaining balance of virtual rewards points after purchase of a representative virtual gift card.

Turning to FIG. 6, the user decides he/she would like to make a purchase from the third merchant 122C—Star Coffee—which has a brick-and-mortar store located in the Warner Building and displayed on the map 152 (see FIG. 2). At present, Star Coffee 122C is 75 ft. away from the portable electronic device 112, which is the third closest merchant to the location of the portable electronic device 112, and is therefore positioned as third from the top of the hierarchy 160 in FIG. 5. To initiate a purchase, the user selects Star Coffee, for example, by touching the corresponding third merchant tile 122C on the touch screen 128A. This selection can be displayed by the software application 150, for example, by highlighting the third tile 122C and contemporaneously displaying one or more available Star Coffee purchases on the display device 130. Optionally or additionally, selection of a particular merchant and/or concomitant display of various purchase options for that merchant 122A-G can be automatically initiated in real time by a proximity trigger—e.g., when it is determined that the portable electronic device 112 and, thus, the user, are within a minimum threshold distance or have entered the store or are standing at a kiosk for that merchant. In some embodiments, the software application 150 can be operable to generate a push notification designed to notify the user of their proximity to a particular merchant and/or highlighting a promotional activity offered by the merchant and/or requesting selection of said merchant. The store or kiosk of a merchant includes a conventional point-of-sale terminal for conducting purchase and sale transactions between the purchaser and the merchant for items for sale by the merchant at the store or kiosk. The point-of-sale terminal can include a barcode scanner for scanning a barcode or other code displayed on the display device 130 of the portable electronic device 112.

In the illustrated embodiment, the map 152 shown on the display device 130 in FIGS. 2-4 is replaced by a design, advertisement or motif, designated generally in FIG. 6 at 138, which can be representative of the selected merchant (e.g., the trade dress of a typical Star Coffee store or a photograph of the interior of the Star Coffee store or a menu of items available for purchase at the Star Coffee store). A popup window 164, which can be generated by the software application 150 overlying a portion of the motif 138, presents the user with a number of purchase options 166 associated with the selected merchant. As used herein, "a purchase" can be "one or more purchases" including, for example, a purchase of a virtual gift card and a subsequent purchase of an item or service at the merchant's store using the purchased virtual gift card. As shown, the purchase options 166 include a STAR CARD gift card 168 associated with the selected Star Coffee merchant 122C. The card value of the gift card 168 can be fixed or can be chosen from one or more predefined values or "Card Amount" 170 (e.g., $30 in FIG. 5), or can be a user-defined value or "Other Amount" 172. Selection of the Card Amount 170 button of FIG. 5, e.g., via the display device 130 touch screen 128A, can trigger a menu 178 which presents the user with a variety of predefined user-selectable values for the gift card 168. The user can choose from the menu 178 one of these user-selectable purchase options. Additional user-selectable options can include adding the card value to a preexisting gift card account associated with the user of the portable electronic device 112 (e.g., via selection of the "Send to my Account" option 174), or delivering the gift card 168 to someone other than the user of the portable electronic device (e.g., via selection of the "Send to a Friend" option 176). The latter option can require the user to enter the intended recipient's personal information and/or an email address, a mailing address, or a preexisting account number for purposes of delivery.

Alternately, as disclosed above, instead of converting the reward points to a virtual gift card, the reward points can be exchanged directly for an item at the merchant, such as a hat, or for a promotional item, such as buy one get one free, or give one get one, at the merchant's store. The reward points can be used on the spot in the merchant's store using the software application 150, without requiring the user to log into any other accounts or visit any external websites or to leave the store and return later. All of the aspects herein allow for instant gratification by the consumer, providing the ability to exchange or convert reward points for a virtual gift card, directly for a good or a service, or for a promotional item at a point-of-sale terminal in a merchant's store or at a merchant's kiosk, such as in a mall.

Returning to the illustrated embodiment above in FIG. 6, prior to, contemporaneous with, or after the card value is set, the software application 150 presents the user with an exchange value 180 of the virtual rewards points required to make the selected purchase associated with the merchant 122C. As seen in FIG. 6, for example, the user is required to convert or redeem 1,500 of 72,000 available VISA® Rewards Points to purchase a $30 card value for a STAR CARD gift card 168. Optionally, the user can be provided with a corresponding virtual-rewards-points exchange value for each of the available purchases from the selected merchant 122C (e.g., via the menu 178) such that the user can make an informed decision as to which option to choose. Typically, but not necessarily, the exchange value for each purchase option can established by the business entity responsible for issuing the rewards points. By way of non-limiting examples, the business entity can establish a universal exchange rate for their rewards points (e.g., 50 points/dollar) or can establish a scale of exchange values for their rewards points (e.g., 100 points/dollar for purchases under $10, 75 points/dollar for purchases between $10 to $20, and 50 points/dollar for purchases over $20).

With continuing reference to FIG. 6, the user submits a final purchase request, for example, by pressing the "Confirm" button 182 on the touch screen 128A of the portable electronic device 112. Alternatively, the user can cancel their purchase, for example, by pressing the "Cancel" button 184, or can alter their purchase, for example, by pressing the "Modify" button 186. In the illustrated embodiment, the user has decided to buy a new virtual gift card 168 with a card value of $30 (a virtual gift card can be generally referred to herein as a virtual prepaid instrument, which exists in electronic form but can optionally be embodied on a physical medium, such as printed on paper or a plastic card). This purchase can be reflected, in part, by the updated balance of virtual rewards points 158 shown in FIG. 7, which reflects the redemption of 1,500 rewards points and a remaining updated balance 158 of 70,500 rewards points. In response to the final purchase request received via the user input device (e.g., display device 128A), the software application 150 submits an authorization request, such as to the points provider server 20, to deduct the exchange value from the balance of the virtual rewards points. Upon receipt of such confirmation, the software application 150 requests the addition of funds—such as the card value if the card is a new card and not an existing card—to the corresponding account. Once completed, the software application 150 provides confirmation of the purchase associated with the selected merchant 122C. The confirmation of the purchase can include displaying a digital representation of the virtual gift card, a confirmatory email, a push notification, a popup-window confirmation, etc., that the card value has been added to the account associated with the gift card. Alternately, if the user is adding to an existing virtual gift card, the exchange value is added to whatever balance was present on the existing virtual gift card. It should be noted that at this stage, the points provider server 20 receives only an authorization request, but does not actually deduct the reward points from the user's reward points account. In some aspects, only after the virtual gift card is authorized and released to the user does the points provider server 20 deduct the reward points from the user's reward points account. The updated balance of reward points 158 as displayed in FIG. 7 does not necessarily mean that the points provider server 20 has actually deducted those points, but rather indicates what the remaining balance would be if the virtual gift card is approved and released by the prepaid instrument provider server 18.

For some preferred embodiments, the gift card 168 is a "virtual gift card" (generally called a virtual prepaid instrument) where a physical (e.g., plastic or paper) gift card or gift voucher is not issued with the purchase. The term "card" includes a voucher, ticket, coupon, and the like, and is not limited to any particular tangible form such as paper or plastic. "Virtual" as used herein means that the prepaid instrument exists electronically, such as an electronically stored file, that is stored on a non-transitory computer-readable medium, such as a memory device. According to some implementations, a virtual gift card account is created and a redemption code (e.g., a "Star Card Number" in FIG. 7) is assigned to that account, such as by the prepaid instrument provider server 18. Confirmation of the user's purchase of a virtual gift card can be limited to displaying, via the display device 130, a digital representation of the virtual gift card with the characterizing indicia of the gift card. As seen, for example, in FIG. 7, the characterizing indicia on the virtual gift card 168 can include a card balance 188, a barcode 190 that can be scanned by the merchant 122A at a point-of-sale terminal, a logo 192 of the merchant 122A, a redemption code/card number 194, etc. Optionally, an email can be sent to the user and/or intended recipient, which includes the redemption code/card number along with the other pertinent information. Virtual gift cards offer many of the conveniences of a traditional gift card, but are typically available within seconds or minutes without the extra time and cost associated with shipping a physical gift card, and are less susceptible to loss and theft. Gift recipients can receive an email notification with a link to activate their virtual gift card. In the context of the present disclosure, virtual gift cards offer the benefit of allowing the user to instantly redeem a virtual gift card, which was replenished or funded by reward points converted into a commensurate amount of currency, at a merchant's store or kiosk without having to leave the store or kiosk and without having to visit any further websites or log into additional accounts to authenticate multiple transactions (such as converting the reward points to a virtual gift card). The software application 150 is configured to allow a user, within just a few clicks or touches within the software application 150 only, to use reward points to buy an item at a merchant location within a few seconds or minutes at the most. The user is not required to visit any outside websites or enter any further authentication information, though in some implementations, these actions are contemplated in this disclosure. Authentication can be handled by the host server 18 when it is present as an interface between the points provider server 20 and the prepaid instrument provider server 18, or by the points provider server 20 when it interfaces directly with the prepaid instrument provider server 18.

Once the rewards points are redeemed or converted, the card value 170 (e.g., $5) is added to the new or existing account associated with the gift card 168, and confirmation of the purchase is received by the user (all of which can occur substantially simultaneously in real time) on the display device 130, the user can purchase goods or services, or both, from the selected merchant 122C while present at the merchant's brick-and-mortar store or kiosk. By using a virtual gift card 168, as exemplified in the illustrated embodiment of FIG. 7, the purchase can be completed, at least in part, via the software application 150 on the portable electronic device 112 with information transferred at a Point-of-Sale (POS) terminal via the displayed virtual gift card 168. As one option, the user can make a purchase directly from the portable electronic device 112, for example, via selection of the a "Make Purchase" button. Pressing the Make Purchase button, e.g., using the touch screen 128A, can bring up one or more items or menu(s) of available purchases, from which the user can choose and purchase goods/services through operation of the software application 150. Once the user completes the transaction, for example, via selection of the "Complete Transaction" button 198, the good(s) and/or service(s) can be transferred at the POS terminal while the user is onsite at the merchant's store. As an optional alternative, the user can present the virtual gift card 168 to a cashier or other employee at the POS terminal, who can confirm the remaining card balance 188, scan the barcode 190, enter or otherwise record the redemption code/card number 194, or any logical combination thereof, to complete the requested purchase. Once the purchase is complete, the card balance 188 is updated in FIG. 7 from $30 to $27.50 to reflect the exchange of funds. The software application 150 can communicate the deduction of $2.50 from the virtual gift card balance to the prepaid instrument provider server 18, which deducts the transaction amount of $2.50 from the balance associated with the virtual gift card stored on the prepaid instrument provider server 18. When the user is finished, the user may then press the "Close" button 196 to dismiss the popup window.

In the illustrated embodiment, the displayed merchants 122A-122G can be a subset of a larger group of participating merchants, where those merchants that are displayed are currently available for participation in the Mobile Gift Rewards program and are within a predetermined proximity of the portable electronic device 112. The software application 150 can provide the user with a search function (e.g., search box 161 in FIG. 5) with which the user can search for some or all of the participating merchants. When the user locates a desired merchant on the portable electronic device 112, the user can select, e.g., via the user input device 128A, one of the participating merchants. Once selected, the user can use the balance of virtual rewards points 158 to convert a selected number of the rewards points into a gift card or other good or service associated with the selected participating merchant. When the user selects one of the participating merchants, a push notification can be sent from the host server 18 to the portable electronic device 112 with a promotional item or a deal of the day to entice the user to visit the selected merchant.

Figure 8:
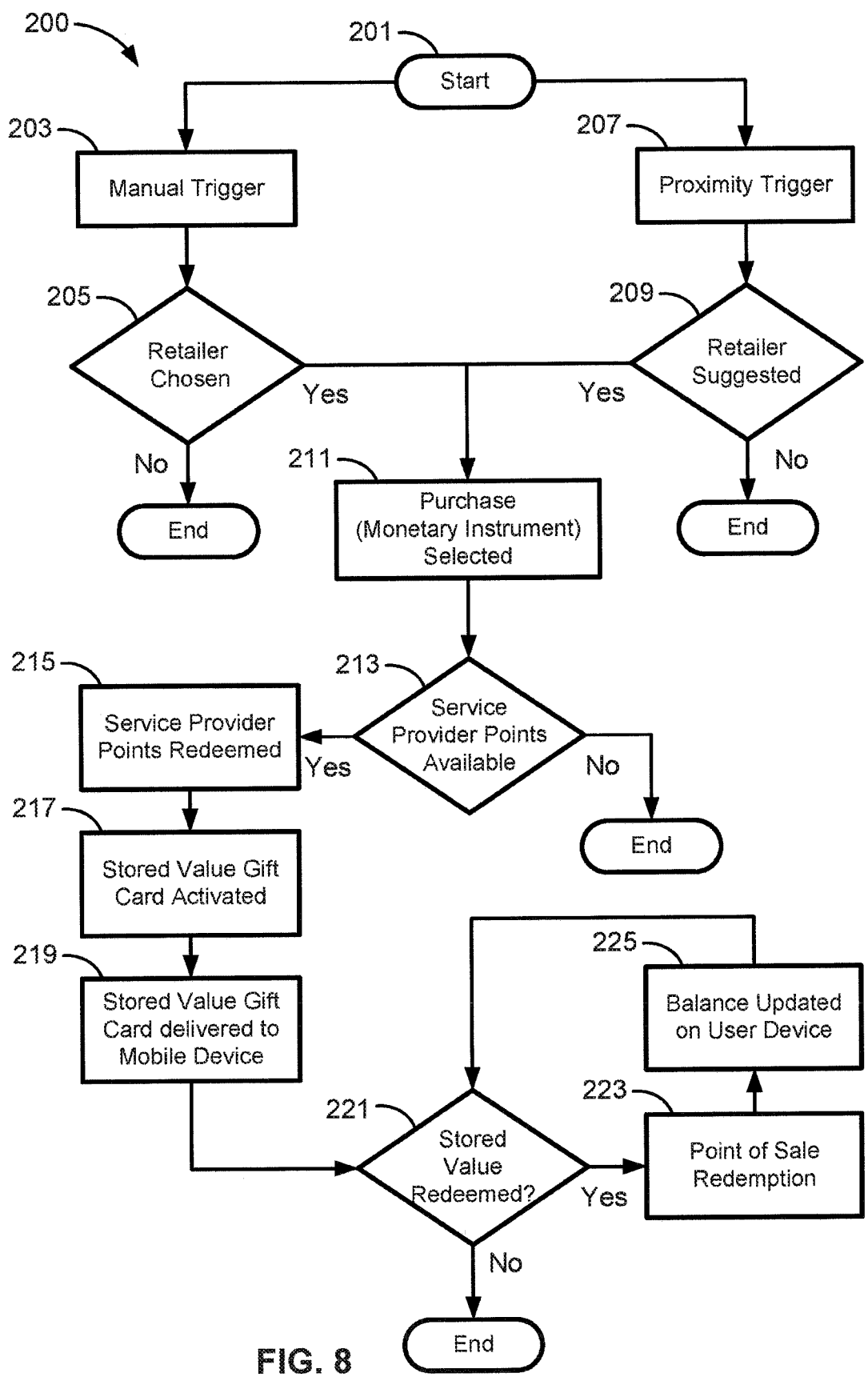
FIG. 8 is a flow chart representing an exemplary algorithm or method for conducting a commercial transaction using a portable electronic device in accordance with aspects of the present disclosure.

With reference now to the flow chart of FIG. 8, an improved method for conducting a commercial transaction using a portable electronic device, such as those devices 12, 112, 122 shown in and described with reference to FIGS. 1-7, for example, is generally described as an algorithm 200 in accordance with aspects of the present disclosure. FIG. 8 can be representative of an algorithm 200 that corresponds to at least some instructions that can be stored, for example, in a memory device, and executed, for example, by a CPU to perform any or all of the above and/or below described functions associated with the disclosed concepts. The method 200 will be described with reference to the various aspects and features shown in FIGS. 1-7 and 9-11 of the drawings; such reference is being provided purely by way of explanation and clarification.

The method 200 starts at block 201, where the user can be required to download or otherwise access dedicated transaction software, which can take the form of or be based on the dedicated mobile software application (or "app") 150. For instance, a mobile device software application can be installed on the user's mobile phone/tablet 122, which facilitates the transfer of loyalty and/or other rewards points 158 into (electronic or virtual) gift cards 168. Block 203 represents a "Manual Trigger," where the user can manually open or otherwise access the mobile app 150 and choose to convert virtual rewards points 158 to make a purchase from a desired merchant 122A-G. In at least some embodiments, opening a software application installed on a portable electronic device automatically initiates the Manual Trigger 203. If the manual trigger 203 is initiated, the user can select a retailer, at block 205, from a list of participating retailers, such as the hierarchy 160 of FIGS. 2-7. This list or hierarchy 160 can be managed by the host server 18 or by the prepaid instrument provider 18, for example, and can be limited, in some embodiments, by location parameters. If the user selects a particular merchant, such as the Star Coffee merchant 122C discussed in the above examples (block 205 =Yes), the method 200 proceeds to query 209. If no selection is made at query 205 (block 205 =No), the method 200 can terminate.

Block 207 represents a "Proximity Trigger," where the portable electronic device 112 supports background location tracking or fencing (e.g., GPS tracking, cellular trilateration, or any of the other options discussed hereinabove) such that proximity alerts (e.g., push notifications, emails, etc.) or the automatic opening of the app 150 can be triggered when a user nears a participating retailer's physical location. According to some aspects of the disclosed concepts, the user can have to change the device's settings and/or their app preferences to enable the Proximity Trigger feature 207. The radius or boundaries of the geo-fence, as well as other merchant-related settings, restrictions, and preferences, can be configured by the retailer or the user, or set as default parameters by the provider of the app 150, or any combination thereof. In some instances, the user's preferences override the retailer's preferences and/or the default settings. When a proximity alert does occur, the retailer that triggered the proximity alert can be highlighted to the user and the user can be prompted, for example, at query 209 to select the suggested retailer. Optionally, the user can select any of the displayed merchants, as described above. While the user can change to a different retailer, a primary use case can be to redeem virtual rewards points with one or more suggested or "preferred" retailers.

Figure 9:
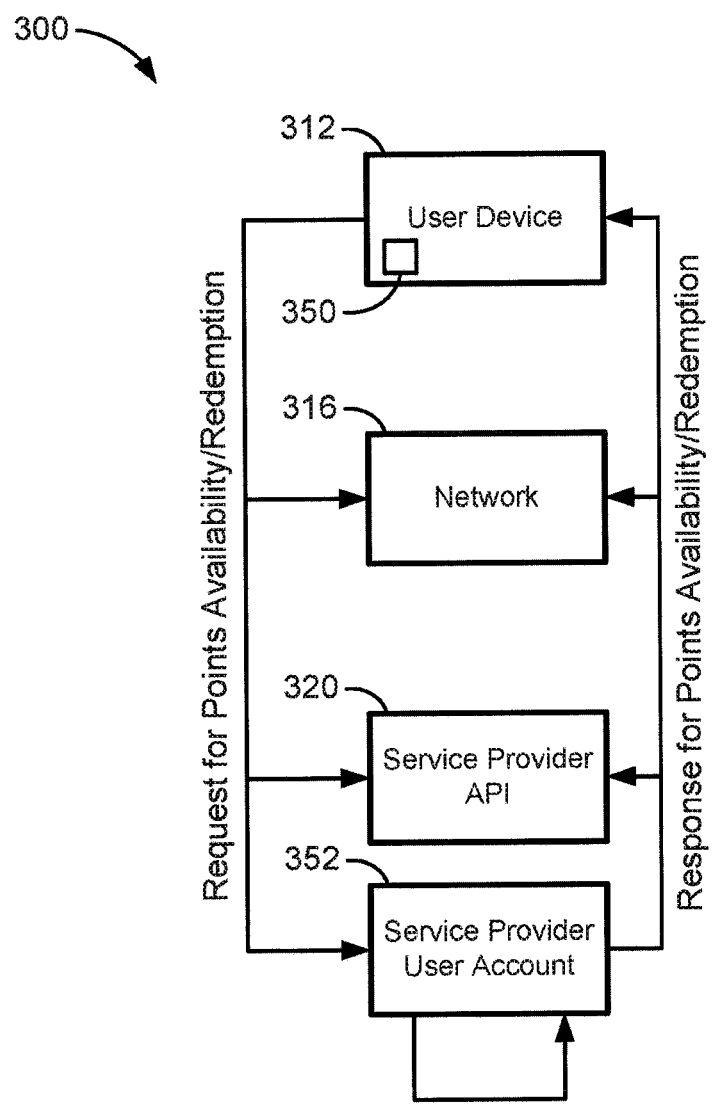
FIG. 9 is a diagrammatic illustration of a system for requesting and acquiring service provider validation and redemption of available virtual rewards points in accordance with aspects of the present disclosure.

Once a retailer is chosen (e.g., at block 205) or suggested (e.g., at block 209), the user selects a monetary instrument (or other good or service) they wish to purchase at block 211. As mentioned above, the user can convert reward points into currency maintained with a virtual gift card or directly for the purchase of an item at the merchant's place of business. The user can configure a denomination, a recipient, a design, and/or a type of the merchant's "closed-loop" virtual gift card. Once configured, the system determines, at step 213, if there are sufficient rewards points available to complete the requested purchase. By way of example, and not limitation, FIG. 9 is a diagrammatic illustration of a system 300, which can be an extension or part of the communications system and network 10 illustrated in FIG. 1, for requesting and acquiring points provider validation and redemption of available virtual rewards points. According to this example, a mobile application 350 on a portable electronic device 312 sends a verification request via a communications network 316 to the Application Programming Interface (API) 320 of the reward points provider server 20 to verify the number of rewards points currently available for redemption by the user. It can be desirable, in at least some embodiments, that this request be routed through a host server (e.g., host server 18 of FIG. 1) of the app provider. When the request is received by the service provider API 320, the user account 352 with the service or points provider server 20 is queried and the available rewards points are made known to the user (e.g., displayed via the portable electronic device 312). An exchange rate or an exchange value of the virtual rewards points to purchase the virtual gift card can also be made known to user. As indicated above, this rate can be configured by the points provider server 20 (e.g., via a Points Provider API and Engine 318). In some embodiments, the user-selected denomination for the virtual gift card must falls within minimum and maximum denominations set by the retailer and, in some configurations, must be available through the gift card service provider 18 and fall under the maximum denomination available from the available points conversion rate.

Once the desired virtual gift card and corresponding denomination has been established, a final validation of the available virtual rewards points can be initiated within the reward points provider's 20 proprietary system and accessed through the points provider's 20 API 320. If there are sufficient rewards points available (query 213 =Yes) the user's rewards points are separated and prepared for redemption. Accessed through the points provider's 20 API 350, this step authorizes the deduction of points within the points provider's proprietary system. In at least some embodiments, as mentioned above, this step does not actually deduct the points, but rather simply authorizes the rewards points for deduction. Once the virtual gift card has been activated and released, the application 150, 350 sends a request to the points provider server 20 a capture or a deduction of the previously authorized reward points, and the points provider server 20 deducts the reward points from the associated reward point account.

Figure 10:
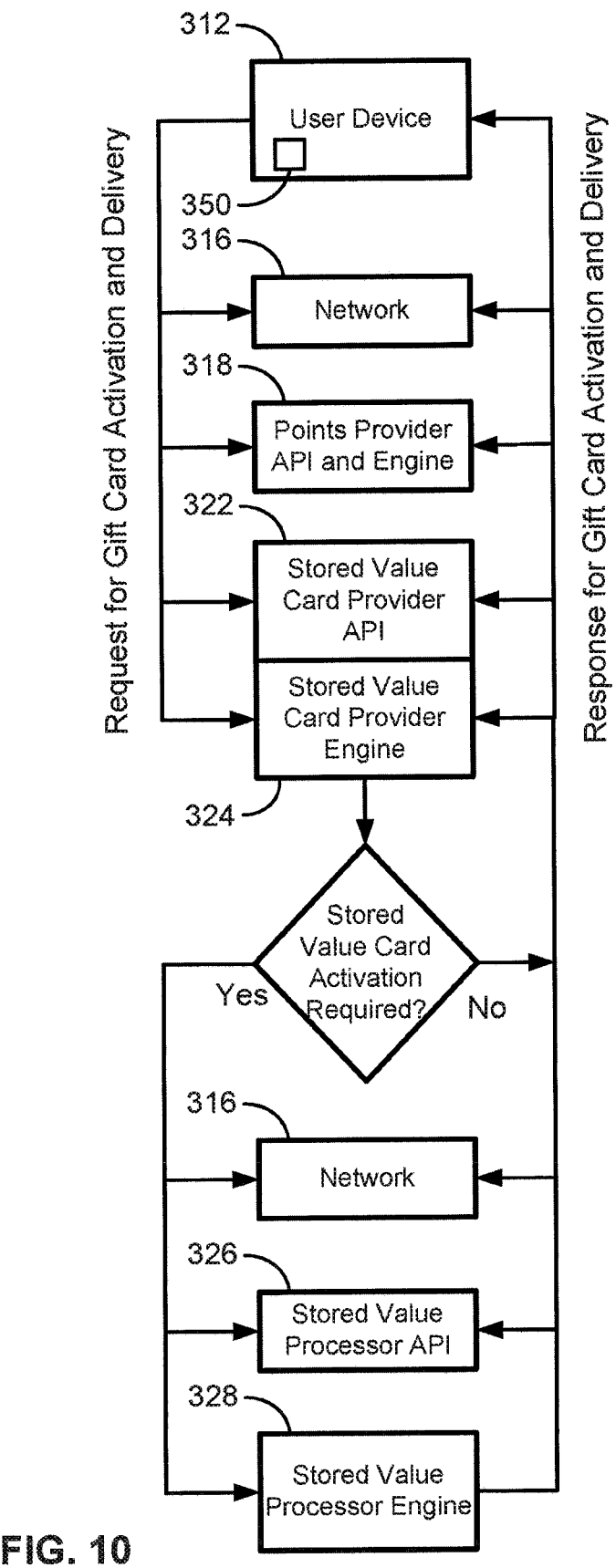
FIG. 10 is a flow chart representing an exemplary system and method for requesting and acquiring virtual gift card activation and delivery in accordance with aspects of the present disclosure.

Upon successful authorization, the rewards points are redeemed at block 215 and the stored value (gift) card is activated at block 217. FIG. 10 illustrates a representative system and method for requesting and acquiring virtual gift card activation and delivery. The mobile application 350 issues a request from the portable electronic device 312, through the network 316 and, in at least some embodiments, through the host server 18 of the app provider, to an API 322 of a prepaid instrument provider server 18, for activation of the specified retailer's closed-loop gift card and for the given denomination. The activation can be made through various activation schemes, including real-time activation through a gift card processor (or stored value card provider engine 324), such as via the prepaid instrument provider server 18, or through delivery of inventoried active cards. At block 219, the gift card provider's proprietary system can deliver an activate gift card from the prepaid instrument provider server 18 in an assortment of ways. For instance, a raw card number and access code (if required by the retailer) can be issued. This option allows the portable electronic device 312 to display the virtual gift card in a format tailored specifically for the mobile application 350. Optionally, a link to a hosted electronic gift card can be issued. In this case, a web page on a web browser will display the card number, bar code, and access code to the user.

Upon successful activation and delivery of the virtual gift card from the prepaid instrument provider server 18 or from the host server 18, the portable electronic device 312 can send a final request to the API 350 of the points provider server 20, requesting a capture (deduction) of the points previously authorized. If the activation of the gift card is not successful for reasons of system error, insufficient remaining inventory, network error, or any other error, for example, the authorization of points can be voided through the API 350 of the points provider server 20.

At step 221, the user can now redeem the value stored on the virtual gift card. In embodiments where the app offers proximity alerts as user nears a participating retailer's brick-and-mortar store or kiosk locations, a common use case will be to have the user redeem the virtual gift card at approximately the same time as when it is delivered. This is not a requirement, however, and the virtual gift card can be stored for future use, such as on the host server 18 or the prepaid instrument provider server 18. Storage of the gift card can include a reference being stored on the portable electronic device 12, 112, 312, while the stored value of the virtual gift card and associated details are authoritatively stored and regulated, for example, by the retailer's gift card processor API 326 and engine 328, as well as the prepaid instrument provider server 18.

The method 200 can optionally continue to block 223, where the user redeems some or all of the stored value (e.g., currency) of the virtual gift card at a point-of-sale (POS) redemption. POS redemption typically occurs at one of the retailer's stores or kiosks and within the retailer's closed-loop card network (e.g., FIG. 10). Redemption can occur in many different ways, for example, according to the technology and protocols the retailer has at a POS terminal. For example, redemption can occur by scanning a barcode (such as a QR code) displayed on the portable electronic device (the barcode can be in any format the retailer supports at their POS terminal), manually entering/keying the card details into the POS system, and/or any NFC technologies the retailer has installed. At block 225, the balance of the virtual gift card is updated and, in at least some embodiments, the updated value is provided to and displayed on the user's portable electronic device. Through either intelligent polling of the potential redemption of the delivered virtual gift card, or through management of current balance's by a gift card provider, the available balance can be updated as close to real time as possible, and concomitantly reflected on the user's mobile device.

In some embodiments, the method 200 includes at least those steps enumerated above. It is also within the scope and spirit of the present invention to omit steps, include additional steps, and/or modify the order presented above.

Methods are also disclosed below of automatically converting rewards points to a virtual prepaid instrument using a portable electronic device 12 having a display device 30 and a user input device 28. Any of these methods described below can be combined or used in conjunction with any aspects disclosed above. A balance of rewards points associated with a user account stored on a points provider server 20 remote from the portable electronic device 12 is received over a wireless network 16 at a portable electronic device 12. The rewards points are non-currency and convertible by a user of the user account to an amount of currency commensurate with the balance of reward points or to a good or a service having a monetary amount or to a voucher, coupon, or promotional item having a monetary value. The promotional item can include, for example, a give one get one item in which the user purchases a virtual gift card having a predetermined monetary value and receives an additional item (good or service) of value, such as another virtual gift card or a discount or a free item. Upon receiving the balance of the reward points, the portable electronic device 12 receives from the user input device 28 an indication of a number of the rewards points to be converted. For example, the user can desire to convert or exchange a certain number of reward points to a desired amount of currency.

In the case where the user elects to convert the reward points to an amount of currency, the portable electronic device 12 communicates over the wireless network 16 the desired amount of currency and a merchant identification directly or through a host server 18 to a stored value prepaid instrument provider server 20. The merchant identification is associated with a merchant at which a virtual prepaid instrument is electronically redeemed for a good or a service at a point-of-sale terminal at a physical location of the merchant 22, 24. The prepaid instrument provider server 20 (a) is remote from the points provider server 20 such that an issuer of the rewards points is a distinct entity from an issuer of the virtual prepaid instrument, (b) generates a code associated with the virtual prepaid instrument, and (c) associates with the code at least the desired amount of currency as a stored value associated with the virtual prepaid instrument. A virtual prepaid instrument exists in electronic form, stored on a non-transitory computer-readable medium, such as an electronic memory device, though the virtual prepaid instrument can be printed or provided onto a tangible medium such as paper, but it is not required to be.

Instead of converting the reward points to an amount of currency (e.g., $5), the user can exchange the reward points for a good or service (such as a free hat valued at $20) at a merchant or for a promotion such as give one get one in which the user purchases a gift card having a minimum value (e.g., $50), and receives another gift card (such as $10) at no additional cost or requiring no additional reward points to be redeemed or a discount (such as $1 off a coffee) to be redeemed at that merchant location within a prescribed period of time. In these examples, the user can be in a merchant's store, use the portable electronic device 12 to instantly exchange on the spot in the merchant's store reward points for the good or service or promotion, without ever leaving the merchant's store and in one transaction that does not require the user to first convert the reward points to an exchange value and use the exchange value to purchase the good or service directly without any exchange of currency or take advantage of the promotion. In each of these examples, the merchant's identity is communicated to the points provider server 20 so that the entity hosting the points provider server 20 can reconcile the value of the redeemed points with the merchant's account. In these examples, the item of value that the user is receiving in exchange for the reward points is associated with a particular merchant, so the merchant identification information is communicated to the points provider server 20 so that authorization can be received for the user to user the reward points at that merchant for the item of value (e.g., a free coffee at a coffee merchant or a promotional item such as buy one get one free or buy a shirt at a clothing merchant and get a free $10 virtual gift card redeemable at the clothing merchant).

Returning to the example above in which the user desires to convert reward points for a stored value prepaid instrument having an associated amount of currency, the display device 30 displays a representation of the code and the stored value associated with the virtual prepaid instrument. The user presents the code (such as a barcode) at the point-of-sale terminal for purchasing the good or the service for a purchase price. For example, the user presents the barcode displayed on the display device 30 to a cashier, who scans the barcode at the point-of-sale terminal at the merchant location. The purchase price of the item scanned is deducted from the stored value to produce a modified stored value, which is displayed on the display device 30.

The portable electronic device 12 communicates over the wireless network 16 the purchase price (e.g., including applicable sales taxes) or the modified stored value directly or through the host server 18 to the prepaid instrument provider server 20 to cause the prepaid instrument provider server 20 to modify the stored value to the modified stored value. It should be emphasized that the host server 18 can be bypassed in these examples.

The portable electronic device 12 communicates directly or through the host server 18 with the prepaid instrument provider server 20 via an application programming interface (API) associated with the prepaid instrument provider 20 using a software application residing on the portable electronic device 12. When the portable electronic device 12 communicates through the host server 18, the host server 18 uses the API associated with the prepaid instrument provider 20 to communicate information securely between the host server 18 and the prepaid instrument provider 20.

The communication of the desired amount of currency and the merchant identification can include a request for an authorization from the points provider server 20 for a deduction of the corresponding number of the reward points. The points provider server 20 returns an indication as to whether the requested authorization was approved.

The portable electronic device 12 can receive, directly or through the host server 18, from the prepaid instrument provider server 20 an indication that the virtual prepaid instrument has been activated by the prepaid instrument provider server and, responsive to receiving the indication that the virtual prepaid instrument has been activated, the portable electronic device communicating to the points provider server a request to deduct the corresponding number of the reward points.

Optionally, the portable electronic device 12 can determine a maximum denomination of currency available for conversion from the balance of the reward points based on a conversion rate between a reward point and a corresponding amount of currency. For example, 100 reward points can be exchanged for $1. The display device 30 displays multiple denominations of currency (e.g., $5, $10, $20), including the maximum denomination, available for selection by the user. For example, if conversion rate is 100 reward points for $1, and the user has 2500 reward points, the maximum denomination of currency in U.S. dollars that can be exchanged is $20. The desired amount of currency corresponds to one of the denominations of currency or an amount of currency entered by the user via the user input device that does not exceed a maximum amount of currency (in this example, the maximum amount cannot exceed $25 for 2500 reward points) corresponding to the balance of the reward points based on the conversion rate.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software forms an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, the numerous aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method for conducting a transaction involving a portable electronic device, the portable electronic device being connected to a network and including a controller, a display device, and a user input device, the method comprising:

providing a graphical user interface (GUI) having a list of a plurality of merchants each having a physical point-of-sale terminal in proximity to a current geographical location of the portable electronic device, the list having a plurality of levels dynamically ordered from top-to-bottom, each of the levels corresponding to a particular category of good or service offered, each of the plurality of merchants being assigned to one of the levels, the levels being subject to reordering based, at least in part, on a time of day, wherein within each level, the merchants are dynamically ordered from left-to-right based on distance from the portable electronic device such that the merchant within the respective level with the physical point-of-sale terminal closest to the current geographical location of the portable electronic device is displayed leftmost, the merchants in each level being subject to reordering within the respective level as the current geographical location of the portable electronic device changes;

receiving, by the controller via the user input device, a selection of one of the plurality of merchants from the list provided on the display device and a stored value amount for a virtual gift card;

sending, by the controller over the network, a first request through a host server of a virtual gift card provider to an Application Programming Interface (API) of a reward points provider to determine whether a reward points account belonging to a user of the portable electronic device has available reward points to redeem for the virtual gift card having the selected stored value amount, the virtual gift card provider and the reward points provider being different from each other and from each of the plurality of merchants;

responsive to a determination that the user has available reward points to redeem for the virtual gift card having the selected stored value amount, receiving, by the controller over the network from a server of the reward points provider, a verification of the available reward points;

sending, by the controller over the network, a request to the virtual gift card provider to activate the virtual gift card with the selected stored value amount and a request to deduct reward points equaling a stored value amount associated with the virtual gift card from the reward points account;

receiving, by the controller over the network from the host server of the virtual gift card provider, data associated with the virtual gift card including at least one of a machine readable code or a card number associated with the virtual gift card; and providing, on the display device by the controller, at least one of the machine readable code or the card number for use by the physical point-of-sale terminal of the selected merchant.

2. The method of claim 1, wherein the GUI further includes a geographical map and one of a symbol, avatar, or icon representing the current location of the portable electronic device.

3. The method of claim 2, wherein the geographical map further identifies a location of each of the physical point-of-sale terminals of the plurality of merchants on the list.

4. The method of claim 1, wherein the list of the plurality of merchants is provided as a plurality of graphical tiles, each graphical tile representing one of the plurality of merchants and including at least one of a name of the respective merchant, a logo of the respective merchant, a location of the physical point-of-sale terminal of the respective merchant, or a distance from the portable device to the location of the physical point-of-sale terminal of the respective merchant.

5. The method of claim 4, wherein at least one of the graphical tiles includes a promotional tag highlighting a promotional marketing program being run by the respective merchant corresponding to the at least one graphical tile.

6. The method of claim 1, wherein the GUI further displays a balance of the available reward points.

7. The method of claim 6, further comprising updating, upon deduction of the reward points equaling the stored value amount for the virtual gift card from the reward points account, the balance shown by the GUI.

8. The method of claim 1, wherein the portable electronic device further includes a location tracking device, the method further comprising:
receiving, by the controller from the location tracking device, location data indicative of the current location of the portable electronic device.

9. The method of claim 1, further comprising:
updating, by the controller following redemption of at least a portion of the stored value amount on the virtual gift card at the selected merchant, a remaining value amount and providing the remaining value amount on the display device.

10. The method of claim 1, wherein the virtual gift card is a closed-loop gift card.

11. The method of claim 1, wherein the GUI further includes a search box configured to receive one or more search terms from the user for searching among the plurality of merchants.

12. The method of claim 1, wherein the GUI further includes a menu that presents a plurality of predefined amounts selectable by the user for use as the stored value amount for the virtual gift card.

13. The method of claim 1, wherein the receiving of the data associated with the virtual gift card includes receiving a link to a web page containing at least one of the card number, the machine readable code, or an access code for the virtual gift card.

14. The method of claim 1, wherein one of the levels corresponds to food eateries and is displayed topmost in the list during mealtimes.

* * * * *